Feb. 17, 1942.  J. H. NEHER  2,273,588
ELECTRIC PROTECTIVE ARRANGEMENT
Filed April 2, 1940
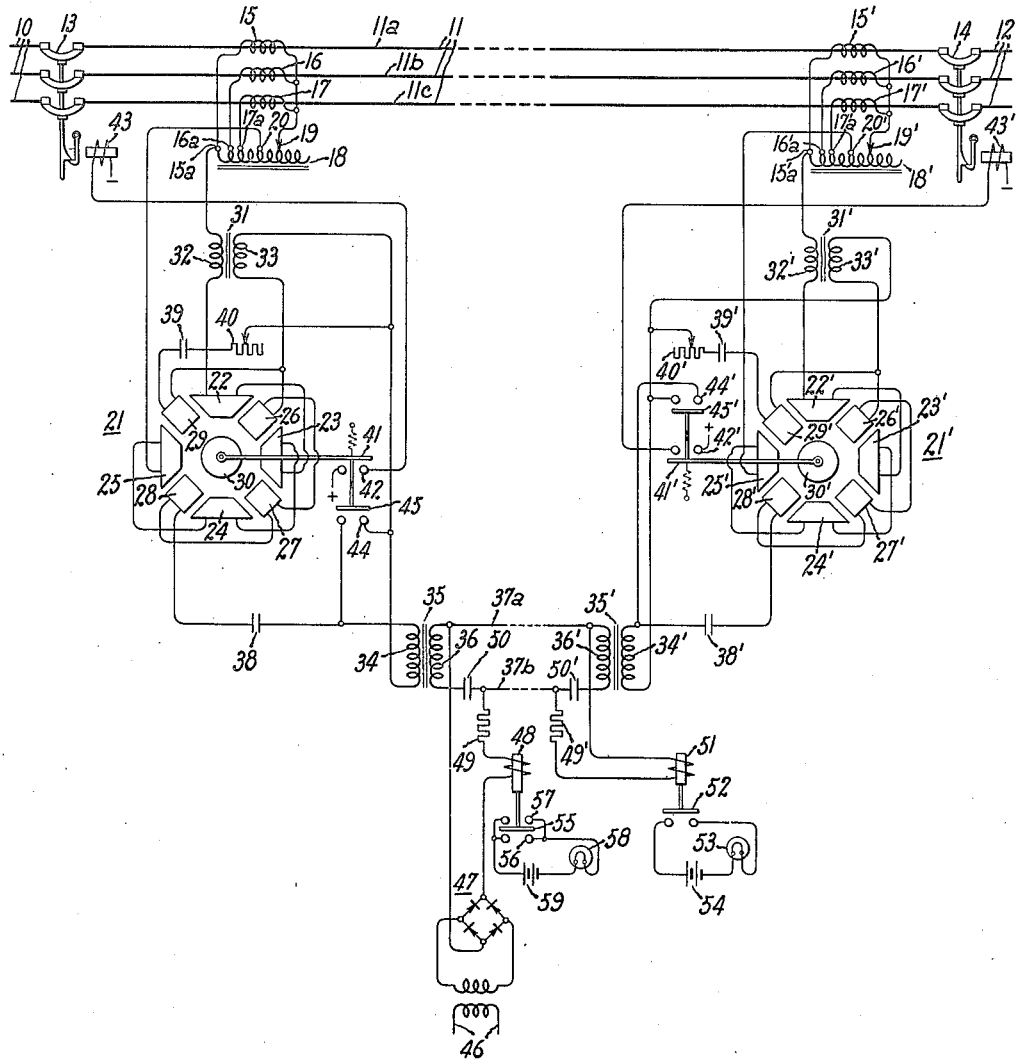
Inventor:
John H. Neher,
by Harry E. Dunham
His Attorney.

Patented Feb. 17, 1942

2,273,588

UNITED STATES PATENT OFFICE 2,273,588

ELECTRIC PROTECTIVE ARRANGEMENT

John H. Neher, Merion, Pa., assignor to General Electric Company, a corporation of New York Application April 2, 1940, Serial No. 327,453

13 Claims. (Cl. 175—294)

My invention relates to electric protective arrangements for alternating-current circuits and more particularly to such arrangements wherein pilot wires are employed.

The increase in size and complexity of power systems and the resulting problems of maintaining stability during system faults have necessitated the rapid clearing of faults. Although high-speed relays of the distance type, for example, are very effective, they fall short of the ideal of providing overall protection with instantaneous operation at both ends for any fault location in a line section. For example, faults near the ends of line sections protected by distance relays are cleared by sequential operation which is accomplished by the relay nearest the fault operating at high speed while, at the other end, the slower speed element operates. In view of the difficulty of coordinating the timing of distance relays and the like, it is physically impractical to secure ideal characteristics of speed and selectivity in relays for transmission line protection that are actuated by factors existing at some one point on the system and yet which are not responsive to oscillations. Thus, it would appear that, to secure overall protection of a circuit, it is necessary to use quantities at two points, such as both ends of a section of line rather than one end. In one arrangement, pilot wires are employed to bring these two quantities together for comparison.

Pilot wire protective systems are based on the well-established principle that, under sound conditions of the circuit, the current entering at one end of the line is equal to that leaving it at the other end, where there are no intermediate connections. Such arrangements heretofore have entailed the use of very complicated apparatus requiring heavily insulated and shielded pilot wires and either specially constructed current transformers which introduced other difficulties or accurately matched and calibrated ordinary current transformers.

Two well-known pilot wire protective schemes have been used heretofore which are generally called the "opposed-voltage or balanced-voltage scheme" and the "circulating-current scheme." In the opposed-voltage scheme, substantially no current flows through the pilot wires when no fault exists in the protected area, whereas, in the circulating-current scheme, current circulates through the pilot wires under normal conditions. Both of these schemes are relatively simple but the former has several advantages over the circulating-current scheme. If the pilot wire circuit should be opened in the opposed-voltage scheme of pilot wire protection, no tripping of the circuit breakers could occur except through the back-up relays which will protect the circuit in case of fault. However, in the circulating-current scheme, an open pilot wire will cause unnecessary tripping of the circuit breakers which cannot be closed until the break in the pilot wire is repaired. The opposed-voltage scheme also has the advantage of being applicable to systems where relatively long pilot wires may be used and, when properly supervised to insure continuity of service which is easily accomplished, would, therefore, seem to be superior to the circulating-current scheme. Both of these schemes heretofore have been deficient in several respects. For example, in most of these systems, all the current required for the operation of the relays had to pass through the pilot wires, thereby necessitating the use of the pilot wires of relatively low resistance and, furthermore, limiting the length of the pilot wires as well as affecting the sensitivity of the system. In such arrangements, it was impossible, therefore, to use comparatively high resistance pilot wires, such as telephone wires, which could be readily leased from communication companies, without limiting the power available for operating the protective relays. Furthermore, since these prior-art schemes applied to the protection of polyphase systems usually required at least three pilot wires, the expense of leasing pilot wires which are usually leased in pairs was high.

The pilot wire schemes mentioned above also required a number of relays in order to make the protective system responsive to both phase and ground faults. In order to decrease the expense of such a protective system, it would be desirable to provide an arrangement wherein only a single relay responsive to both phase and ground faults, one located at either end of the pilot system, would be required and which would produce a sufficiently large torque under all of these conditions to give complete protection.

Pilot wire protective arrangements have been proposed for polyphase systems using only two pilot wires and a single relay at each end to protect against both phase and ground faults but, in some of these arrangements, it was necessary to provide complicated networks entailing considerable additional equipment and consequent additional expense while in other arrangements still other difficulties were encountered. In order to eliminate some of these difficulties, pilot wire systems using direct current in the pilot wire circuit were developed. Systems of this type give satisfactory protection but are too expensive for many applications.

Capacity currents flowing in the pilot wires in many pilot wire protective systems have caused the relays to operate to isolate the protected area even though the fault was outside this area if the opposed-voltage scheme were used. In order to prevent operation of the relay on such capacity currents, many expensive and complicated arrangements were provided, such as expensive highly insulated sheathed cables and the like. It would be desirable to provide a pilot wire protective system wherein the effect of capacity currents is negligible without having to resort to expensive means for eliminating such effect.

In some of the prior art pilot wire protective systems for polyphase circuits using only two pilot wires and a single relay at either end thereof, it is possible to obtain a so-called "blind spot" for particular fault and load conditions. In other words, no tripping torque is applied to either relay even though a fault condition existed. It would be very desirable if a pilot wire protective system could be constructed in which such a "blind spot" would not exist. It will be understood that in any pilot wire system for the protection of polyphase transmission lines using only a single relay at each end that under a certain fault condition and with particular circuit constants, a situation may exist where, although there is a fault in the protected line section, a tripping torque will be applied to the relay at only one end while no tripping torque will be applied to the relay at the other end. The relay on one end of the protected section will, of course, cause immediate tripping of the circuit breakers at that end and eventually the relay at the other end of the pilot wire will be subjected to an operating torque. In order to increase the speed of isolating the faulted line section it would be desirable under such conditions to provide means for causing immediate operation of the other relay without waiting for sequential breaker and relay operation. Since telephone wires which are normally leased for pilot wire purposes have definite voltage and power limitations it would furthermore be desirable that the voltage applied to the pilot wires is maintained below a predetermined maximum.

Accordingly, it is an object of my invention to provide a new and improved pilot wire protective system using only two pilot wires and a single relay at either end thereof for providing complete protection on both phase and ground faults in a polyphase power system without requiring complicated networks or the like.

It is another object of my invention to provide a new and improved pilot wire protective arrangement wherein a smaller current than was heretofore necessary is required to flow in the pilot wires for operating the relays so that the length and ohmic resistance of the pilot wires have little effect on the sensitiveness of the protective apparatus and yet wherein the small pilot wire current produces a large relay torque for initiating the operation of the protective apparatus.

A further object of my invention is to provide a new and improved pilot wire protective system in which ordinary current transformers may be used which need not be carefully constructed so as to be exactly similar as far as the characteristics thereof are concerned.

Still another object of my invention is to provide a new and improved pilot wire protective system wherein pilot wire capacity currents are ineffective to operate the relays so that heavy currents flowing through the protected area to faults outside this area do not cause relay operation.

It is another object of my invention to provide a new and improved pilot wire protective system employing only two pilot wires wherein it is impossible to obtain a "blind spot" which prevents the operation of the protective apparatus.

It is another object of my invention to provide a pilot wire protective system using directional wattmetric relays wherein operation of the relay at one end of the system will cause immediate isolating of the protected area without depending upon sequential circuit breaker and relay operation.

It is another object of my invention to provide a new and improved pilot wire protective system wherein the voltage on the pilot wires is definitely limited and the effect of "freak" wave shapes is minimized.

Further objects and advantages of my invention will become apparent as the following description proceeds and the features of novelty which characterize my invention will be pointed out with particularity in the claims annexed to and forming a part of this specification.

While my protective system is utilizable in many different applications such as the protection of any polyphase electrical instrumentality of a type which is so connected in use as to have polyphase currents entering through polyphase conductors on one side thereof and polyphase currents leaving through polyphase conductors on the other side thereof or such as the protection in general of any two portions of a polyphase system, the currents of which are to be compared, I have illustrated my invention in connection with the particular example of a transmission line section since such illustration embodies the broad principles of pilot wire protection.

Referring now to the drawing, my invention is illustrated as applied to a three-phase transmission system comprising a plurality of line sections 10, 11, and 12, which are interconnected into a continuous transmission system by means of circuit breakers 13 and 14, schematically illustrated. Each of the sections, such as the middle section 11, may be protected by the apparatus of my invention.

Since each end of the pilot wire protective system is provided with identical apparatus, only that at the left end of the transmission line, section 11 of the drawing, will be described while the corresponding parts of the apparatus at the other end will be designated by the same reference numerals marked with a prime. Referring now to the left-hand end of transmission line section 11, I have provided a plurality of single-phase equal-ratio current transformers having secondary windings 15, 16, and 17, each associated with one of the phases 11a, 11b and 11c respectively. These three secondary windings 15, 16, and 17 connected in star relationship have their end terminals 15a, 16a, and 17a connected to separate tapping points on a suitable summation transformer 18 illustrated as of the autotransformer type so that, with a balanced three-phase current in the protected transmission line 11, the voltages produced in summation transformer 18 due to the three phases 11a, 11b, and 11c differ from one another by a small but definite amount. The star point of the secondary windings 15, 16, and 17 of the current transformers is connected to an adjustable tap 19 on summation autotransformer 18 so that the sensitivity of the apparatus for ground faults may be controlled and, further, so that, under no conditions for a particular application will the output of summation transformer 18 be zero. The summation transformer 18, although illustrated as an autotransformer, could just as well be a transformer of the type having separate primary and secondary windings, but a single autotransformer winding is preferable both from the cost and space standpoint. By means of such a summation transformer, a single electrical quantity is obtained which is proportional to the current conditions in the different phases of transmission line section 11. Under normal conditions, a relatively small current flows as the output of summation transformer 18 obtained across output terminals 15a and 20. For a fault between phases 11a and 11b, a much larger current flows through the portion of summation transformer 18 between terminals 15a and 16a than under normal conditions. Similarly for a fault between terminals 11a and 11c, the portion of summation transformer 18 between terminals 15a and 17a carries a much larger current while, for a fault between phases 11b and 11c, the portion of summation transformer 18 between terminals 16a and 17a carries the larger current. A three-phase fault, of course, will cause a considerable increase in current flow in the portion of summation transformer 18 between terminals 15a and 17a. For ground fault conditions, the portion of the winding of summation transformer 18 between adjustable terminal 19 and terminals 15a, 16a, or 17a, depending upon which phase or phases are grounded carries the considerably increased current.

It is impossible for a "blind spot" to exist in my protective system; that is, the output from both summation transformers 18 and 18' will never be zero simultaneously. However, it might be possible that the output from the terminals of one of the summation transformers, for example 18, could tend to be zero even though a fault condition existed in the protected section 11 of the transmission line. Under rare situations, such a condition could exist for a specific apparatus when the load current is opposing the residual current during a ground fault. However, by means of adjustable tap 19, I eliminate the possibility that the output from summation transformers 18 and 18' could ever be zero for a particular apparatus. Furthermore by this arrangement, sensitive ground fault protection of the pilot wire protective system is afforded in addition to phase fault protection, by means of only two pilot wires and a single relay at each end of the polyphase feeder to be protected.

If, in the pilot wire system, relays are employed of the type wherein the torque developed is proportional to the watts loss in the relay coils, the torque developed will be limited by the maximum power which may be transmitted over the pilot wires. If pilot wires of the telephone type are used, the power limitations which are usually put on these wires so restricts their use that only supersensitive relays of the above-mentioned type can be employed. If, however, relays of the wattmetric type are employed, the torque developed in the relay is a function of the product of the ampere turns of the coils in the relay. By using a wattmetric relay of this type, certain of the coils thereof may be connected in series with the pilot wire circuit which may be arranged to carry only a very small current but, nevertheless, a large torque for operating the relay may be obtained simply by increasing the current which flows through the polarizing coils of the relay which are not connected in series with the pilot wires but, as in my invention, are connected to the output of summation transformers 18 and 18', respectively. Therefore, I provide a differential relay 21 of the wattmetric type similar to the relay described and claimed in United States Letters Patents 2,110,655, 2,110,673, 2,110,676, and 2,110,686 granted March 8, 1938, on applications of E. H. Bancker, A. J. McConnell, D. C. Prince, and V. E. Verrall, respectively, and assigned to the same assignee as the present invention. Relay 21 is illustrated as comprising eight coils or windings 22, 23, 24, 25, 26, 27, 28, and 29, respectively, and a cup type rotor 30. The output of summation transformer 18 is arranged to be connected to energize polarizing windings 22 to 25, which are connected in series in such a manner as to produce at any instant alternate fluxes in coils designated by consecutive numbers.

Since the torque in a wattmetric type of relay is proportional to the product of the fluxes produced by the different coils multiplied by the sine of the angle between the fluxes, it will be understood by those skilled in the art that the maximum torque is obtained when these fluxes differ in phase by ninety electrical degrees. Accordingly, I provide a high-reactance transformer 31, which may be an air-gap transformer, having its primary winding 32 connected in series with the output of summation transformer 18 and its secondary winding 33 arranged to be connected in series with coils 26, 27, and 28 of relay 21 and the primary winding 34 of a suitable insulating transformer 35 having a secondary winding 36. The secondary windings 36 and 36' of the insulating transformers at each of the relaying stations at the respective ends of transmission line section 11 are connected in opposed-voltage relationship through a pair of pilot wires 37a and 37b so that, with equal outputs from summation transformers 18 and 18', substantially no current will flow in pilot wires 37a and 37b. It will be understood by those skilled in the art that, under certain conditions, insulating transformers 35 and 35' may not be necessary.

Since the pilot wire circuit and the coils 26 to 28 of relay 21 are inductive, a suitable capacitor 38 may be connected in series with this circuit to neutralize the above-mentioned inductance and to produce substantally an in-phase current in this circuit so that substantially a ninety degree relationship between the current flowing in coils 22 to 25 and 26 to 28, respectively, is obtained. The interaction of the fluxes produced by coils 26 to 28 and 22 to 25 produces an operating torque for the relay 21. In considering the operating torque produced, it is convenient to consider the arrangement including coils 22 to 28 as comprising six wattmetric type elements all acting upon a single rotor 30, the combination of each coil and an adjacent coil being assumed to be one element. Extraneous torques are, of course, developed by combinations of coils which are not adjacent. However, the torque of adjacent pairs of poles is large relative to that of any other pair. Furthermore, the torques due to coils which are not adjacent but still appreciable are balanced out to substantially zero by so arranging the connections to these coils.

In order to prevent relay 21 from operating upon the occurrence of extremely heavy currents flowing through transmission line section 11 due to a fault outside of the section, relay 21 is arranged so as to operate upon a predetermined percentage of unbalance between the line currents at the two ends of section 11. That is, relay 21 responds to a percentage or ratio represented by the difference between the line currents at the two ends of the protected line section 11 divided by the line current. Under heavy through fault current conditions, the difference between the currents at both ends of the protected section 11 should be zero. Actually, such perfect balance is not possible particularly under high-current conditions which may cause the current transformers having secondary windings 15, 16, 17, and 15', 16', 17' to approaching saturation in different degrees resulting in discrepancies in the current transformer ratios at the two ends of the protected line section. The significance of this is that, if relay 21 responded to a predetermined amount of unbalance of current between the the two ends of transmission line 11, it might be operated when an exremely large current flows through the protected line section, whereas, if relay 21 operates upon a predetermined percentage of unbalance, it will not be affected by the difference in the characteristics of the current transformers or by any other causes resulting in a comparatively small current unbalance as compared to the actual line currents flowing at the moment. Although my invention is not limited to the use of directional relays operating on the percentage principle, it is, nevertheless, an important advantage of my invention that it permits the use of such relays at both ends of the protected line section 11.

This percentage characteristic is obtained by means of winding 29 which is also connected across the output of secondary winding 33 of transformer 31 in such a manner as to produce in conjunction with the other relay windings a restraining or negative torque on the rotor 30 of relay 21 while windings 26, 27, and 28 tend to produce a positive or operating torque. This restraining torque, as will be obvious to one skilled in the art, is proportional to the current flowing in the polarizing coils 22 to 25 of relay 21 and displaced in phase therefrom by substantially ninety electrical degrees. To insure this ninety degree relationship, capacitor 39 connected in series with winding 29 is provided. In order to predetermine the percentage unbalance that must obtain before relay 21 operates, I provide an adjustable resistance 40 for adjusting the amount of current which may flow through restraining coil 29 thereby controlling the restraining torque on relay 21 and, hence, the percentage characteristic thereof. In normal operation, it might be desirable to adjust resistances 40 and 40' so that operation of the relay occurs when the difference between the outputs of summation transformers 18 and 18' is equal to fifty per cent of the smaller of these two outputs. By this arrangement, a relay-operating torque is obtained for faults on the protected line section and a relay-restraining torque for through fault currents, because, in the latter case, the currents in the restraining coils 29 and 29' are increased greatly while the pilot wire current remains substantially zero.

In the relay 21, the torque T on rotor 30 may be expressed by the following equation:

$$T = K_1 I_{22} I_{26} \sin \theta_1 - K_2 I_{22} I_{29} \sin \theta_2$$

where $I_{22}$, $I_{26}$, and $I_{29}$ are the currents flowing through these particular coils of relay 21, $\theta_1$ and $\theta_2$ are the angles representing the vector relationship between the currents associated with the respective windings which are adjusted to be substantially ninety degrees for maximum torque, and $K_1$ and $K_2$ are constants. The first quantity in this equation represents the operating torque of the relay while the second quantity represents the restraining torque of the relay.

In order to control the tripping of circuit breaker 13, the rotor 30 of relay 21 is provided with a switch 41 adapted to bridge contacts 42 so as to energize tripping coil 43 of circuit breaker 13. Similarly, rotor 30' of relay 21' is provided with a switch 41' arranged to bridge contacts 42' to trip circuit breaker 14.

Under certain rare fault conditions due to the fact that summation transformers 18 and 18' are used to obtain a single electrical quantity proportional to the currents flowing in a polyphase transmission line, it is possible as has been mentioned before that the output of summation transformer 18' for example would be very small or zero so that no relay operating torque is produced in relay 21' even though a fault condition exists in the protected line section. However, taps 19 and 19' on summation transformers 18 and 18', respectively, are adjusted so that for the specific installation the output of these transformers will never be zero under any fault condition. Due to the directions of current flow of the outputs of summation transformers 18 and 18' under certain fault conditions it may be possible that a negative or restraining torque instead of an operating torque is applied to one of the relays at one end of the protected line section thereby preventing simultaneous tripping of the circuit breakers at the two ends of this line section. In order to speed up the tripping or isolating of transmission line section 11 under this rare fault situation when there is a negative or restraining torque on one of the relays 21 or 21', contacts 44 and 44' are provided respectively on relays 21 and 21' so as to short circuit the pilot wires 37a or 37b when bridged by switching means 45 or 45' if relay 21 or 21' closes its contacts to trip the associated circuit breakers 13 or 14, respectively. As soon as the pilot wires 37a and 37b are short circuited, the relay which initially had a negative or restraining torque impressed thereon now has an operating torque to cause tripping of its associated circuit breaker. Therefore, the tripping time of the pilot wire relaying system in such a case is increased only by the operating time of a relay even under this extreme condition and it is unnecessary to depend upon sequential tripping of the circuit breakers.

It will be observed that, in the opposed-voltage scheme of pilot wire protection described above, there will normally exist a voltage difference between the two conductors 37a and 37b of the pilot wire channel but no current will flow in these conductors. It might easily happen that one or both of the pilot wires 37a or 37b might break or become open circuited in which case nothing would happen until a fault should develop in line section 11 and the protective means of my invention would then fail to operate because of the open circuit in the pilot wires and it would be necessary to depend on the "back-up" relays (not shown) for protection. It would be desirable, therefore, if the operator were informed of the fact that the pilot wires were either open circuited or short circuited. To provide against this contingency, I utilize in accordance with my invention some suitable means for operating an alarm in the event of a breakage in the pilot wire channel or a short circuiting of the pilot wires and, by the word "alarm," I mean to include either a visible or audible signal for indicating the faulty pilot wire condition, relying upon the station attendant to correct that condition as by the substitution of a sound pilot wire channel or a means for automatically doing that which it is expected that the attendant would do manually in response to a signal.

In accordance with my invention and in order to indicate the condition of pilot wires 37a and 37b, I superimpose on the pilot wire circuit a small direct current which may be obtained from any suitable source of alternating current 46 through a full-wave rectifier 47, the output of which is connected through a relay 48 and a resistor 49 across a capacitor 50 connected in series with pilot wire 37b. The value of this direct current is sufficiently small so as to have no substantial saturating effect on transformers 35 and 35'. However, to avoid any difficulty of this nature, the capacitor 50 is connected, as shown in the drawings, so that the direct current from rectifier 47 cannot flow in the winding 36 of insulating transformer 35. At the other end of the pilot wire protective system, a relay 51 is connected across capacitor 50' and in series with a current-limiting resistor 49', capacitor 50' preventing the direct current from flowing in winding 36' of insulating transformer 35'. Capacitors 50 and 50' may be advantageously utilized to neutralize some of the reactance of the pilot wire channel including the reactance of transformers 35 and 35' and, accordingly, capacitors 38 and 38' may be constructed so as to provide less capacitive impedance. Therefore, capacitors 50 and 50' provide a path for the pilot wire current but prevent the direct current from following this path and cause the latter to flow through the relays 48 and 51.

Relay 51 is arranged to control a switch 52 for energizing a suitable signal 53 from power source 54 indicated as a battery. Similarly, relay 48 is arranged to control a switch 55 which is adapted to bridge in either of its extreme positions contacts 56 or 57 so as to energize a signal 58 from a source of power 59, schematically illustrated as a battery. Under normal conditions, relays 48 and 51 are adjusted so that the direct current flowing through the pilot wire circuit limited by resistors 49 and 49' is sufficient to energize relays 48 and 51 so that the former opens contacts 56 and the latter opens contacts 52. However, the energization of relay 48 is insufficient to cause switch 55 to bridge contacts 57. If the pilot wire circuit were broken, the path of the direct current obtained from rectifier 47 is interrupted and relays 48 and 51 would be deenergized so as to close the energizing circuits for signals 58 and 53, whereupon the attendants at either ends of the transmission line section 11 would be informed of the faulty pilot wire condition. If, on the other hand, pilot wires 37a and 37b were short circuited, relay 51 would become deenergized as before so as to energize signal 53 but the impedance afforded to the direct current flowing through relay 48 would be decreased sufficiently so that switch 55 is caused to bridge contacts 57 thereby again energizing signal 58 and indicating a faulty pilot wire condition.

In any practical pilot wire system, it is important to prevent capacity currents which are likely to flow under extreme through fault conditions from causing tripping of circuit breakers 13 and 14. These pilot wire capacity currents will lead the normal current flowing in the pilot wire by substantially ninety elecerical degrees. However, since the current in the pilot wire circuit in view of the arrangement described above leads the current in the polarizing circuit of coils 22 to 25 by ninety electrical degrees, the capacity currents will be displaced by 180 electrical degrees from the polarizing current and, in view of the torque equation set forth above, theoretically no torque for operating relays 21 or 21' will be provided by these currents. As a practical matter, the effect of these currents is negligible.

In accordance with my invention, two factors cooperate to definitely limit the voltage across pilot wires 37a and 37b. In the first place, summation transformers 18 and 18' are constructed so as to saturate at high values of line currents flowing in line section 11, whereby the output thereof is limited as is also the pilot wire voltage. Furthermore, by means of capacitors 38 and 38', the pilot wire circuit is tuned to resonance at the system frequency and, for any "freak" wave forms which include harmonics, most of the resulting voltage in the pilot wire circuit will appear across the inductance and, hence, across windings 26 to 28 and 26' to 28' of relays 21 and 21' respectively which block the higher harmonics and thereby the pilot wire voltage is not substantially affected.

The operation of the pilot wire protective system embodying my invention will best be understood by considering the apparatus as illustrated in the diagram under normal conditions. Summation transformers 18 and 18' will provide a single-phase current for polarizing windings 22 to 25 and 22' to 25' of relays 21 and 21', respectively. By means of transformers 31 and 31', small components of voltage are obtained for energizing another group of windings of relays 21 and 21' and the primary windings 34 and 34' of insulating transformers 35 and 35' which have their corresponding secondary windings connected in opposition through pilot wires 37a and 37b. Hence, under normal conditions, since these voltages of transformers 31 and 31' are substantially equal and opposite, no current flows through the operating winding of relays 21 and 21'. Furthermore, due to windings 29 and 29' and the current flowing therein, a negative or restraining torque is continually applied to the respective relays 21 and 21'. This restraining torque is proportional to the current flowing in the transmission line and may be suitably adjusted by variable resistors 40 and 40'. If a fault should occur in transmission section 11, however, the outputs of summation transformers 18 and 18' will no longer be equal and a current will flow in the operating coils of relays 21 and 21' and pilot wires 37a and 37b which is proportional to the difference between the currents entering and leaving transmission line section 11. This current will cause relays 21 and 21' to operate to cause isolation of this transmission line section 11. If only one of these relays should be operated under such conditions, the other relay will immediately be operated due to the shorting of the pilot wires which is accomplished upon the operation of the first relay to initiate circuit breaker tripping.

In view of the detailed description given above, the operation of the supervisory system for indicating the condition of the pilot wires will be well understood by those skilled in the art and no further discussion will be included.

Although I have described my invention as applied to the opposed-voltage scheme of pilot wire protection, it will be understood by those skilled in the art that the circulating-current scheme might also be used therewith.

While I have shown and described a particular embodiment of my invention as applied to an electric protective system, schematically shown, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States, is:

1. In a protective system for a polyphase alternating-current transmission line having two distant relaying stations at opposite ends of a line section thereof, means for providing a communication channel between said stations, means responsive to the line currents at each of said stations for deriving a relaying current therefrom, a relay at each of said stations comprising a plurality of windings, means for energizing one of said windings directly by said relaying current, means for energizing another of said windings with a component of current derived from said relaying current but displaced in phase therefrom whereby a relay operating torque is produced due to the interaction of the fluxes set up by the currents flowing in said windings, said last-mentioned winding at each of said stations being connected in opposed-voltage relationship through said first-mentioned means so that substantially no current flows therethrough to produce a relay-operating torque under sound conditions of said line section, and an additional winding on each of said relays energized with a component of current derived from said relaying current for producing a relay-restraining torque.

2. In a protective system for a polyphase alternating-current transmission line, means responsive to the line currents at a point on said transmission line for deriving a relaying current therefrom, similar means responsive to the line currents at another point on said transmission line remote from said first point for deriving a relaying current therefrom, means for providing a communication channel between said points, a differential relay of the wattmetric type associated with each of said points on the transmission line comprising a plurality of windings, means for energizing one of said windings directly by said relaying current, means for energizing another of said windings with a component of current derived from said relaying current but displaced in phase therefrom whereby a relay-operating torque is produced by virtue of the interaction of the fluxes set up by the currents flowing in said windings, said last-mentioned windings of the relays at each of said points on the transmission line being connected in opposed-voltage relationship through said means for providing a communication channel so that substantially no current flows therethrough to produce a relay-operating torque under sound conditions of said transmission line between said points, an additional winding on each of said relays, and means for energizing said additional winding with a component of current derived from said relaying current so as to produce an adjustable restraining torque on said relays proportional to the line current prevailing at each of said points.

3. In a protective system for a polyphase alternating-current transmission line having two distant relaying stations at opposite ends of a line section thereof, means for providing a communication channel between said stations for deriving a relaying current therefrom, a differential relay of the wattmetric type at each of said stations comprising a plurality of windings, a plurality of said windings being arranged to be energized directly by said relaying current, means for deriving from said relaying current a component of current displaced in phase therefrom to energize certain other of said windings for producing a relay-operating torque due to the interaction of the fluxes set up by the currents flowing in said windings, said other windings at each of said stations being connected in opposed-voltage relationship through said first-mentioned means so that substantially no current flows therethrough to produce a relay-operating torque under sound conditions of said line section, an additional winding on each of said relays, and means for energizing said additional winding with a component of current adjustable in magnitude for producing in conjunction with said other windings a restraining relay torque of a magnitude proportional to the line current prevailing at said respective relaying stations at any particular moment.

4. In a protective system for a polyphase alternating-current transmission line having two distant relaying stations at opposite ends of a line section thereof, means for providing a communication channel between said stations, means responsive to the line current at each of said stations for deriving a single-phase relaying current responsive to the current conditions in the plurality of phases of said transmission line including a summation transformer and a plurality of current transformers each of which is associated with a different phase of said transmission line and having one terminal thereof connected to different tappings on said summation transformer, the other terminals of said current transformers being connected to an adjustable tap on said summation transformer, and a differential relay of the wattmetric type at each of said stations comprising a plurality of windings a portion of which are arranged to be energized directly by said single-phase relaying current from said summation transformer, a second portion of said windings being connected in series with said first-mentioned means, means for energizing said second portion of said windings by a component of current derived from said single-phase current but displaced in phase therefrom for producing in conjunction with said first-mentioned windings an operating torque for said relay, another winding on said relays, and means for energizing said last-mentioned winding with a component of current adjustable in magnitude derived from said single-phase current for producing a restraining torque on said relays proportional to the line currents prevailing at the respective stations.

5. In a protective system for a polyphase alternating-current transmission line, means responsive to the line currents at a point on said transmission line for deriving a relaying current therefrom, similar means responsive to the line currents at another point on said transmission line remote from said first point for deriving a relaying current therefrom, means for providing a communication channel between said points, a relay at each of said points comprising a plurality of windings, means for energizing one of said windings directly from said relaying current, means for energizing another of said windings with a component of current derived from said relaying current but displaced in phase therefrom whereby a relay operating torque is produced due to the interaction of the fluxes set up by the currents flowing in said windings, said last-mentioned windings of the relays at each of said points on said transmission line being electrically interconnected through said communication channel, an additional winding on each of said relays, and means for energizing said additional winding with a component of current derived from said relaying current for producing a relay-restraining torque.

6. In a protective system for a polyphase alternating-current transmission line having two distant relaying stations at opposite ends of a line section thereof, means for providing a communication channel between said stations, means responsive to the line currents at each of said stations for deriving a relaying current therefrom, a relay at each of said stations comprising a plurality of windings, means for energizing one of said windings directly from said relaying current, means for energizing another of said windings with a component of current derived from said relaying current but displaced in phase therefrom whereby a relaying operating torque is produced due to the interaction of the fluxes set up by the currents flowing in said windings, said last-mentioned windings of the relays at each of said stations being electrically interconnected through said first-mentioned means in such a manner that substantially no relay-operating torque is produced under sound conditions of said line section, an additional winding on each of said relays, and means for energizing said additional winding with a component of current derived from said relaying current for producing an adjustable restraining torque on said relays proportional to the line current at each of said stations.

7. In a protective system for a polyphase alternating-current transmission line having two distant relaying stations at opposite ends of a line section thereof, means including a pair of pilot wires for providing a communication channel between said stations, means responsive to the line currents at each of said stations for deriving a relaying current therefrom, a relay at each of said stations comprising a plurality of windings, means for energizing one of said windings directly from said relaying current, means for energizing another of said windings with a component of current derived from said relaying current but displaced in phase therefrom whereby a relay operating torque is produced due to the interaction of the fluxes set up by the currents flowing in said windings, said last-mentioned winding at each of said stations being connected in opposed-voltage relationship through said first-mentioned means so that substantially no current flows therethrough to produce a relay-operating torque under sound conditions of said line section, an additional winding on each of said relays, means for energizing said additional winding with a component of current derived from said relaying current for producing a relay-restraining torque, and means associated with each of said relays for short circuiting said pilot wires upon operation of either of said relays.

8. In a protective system for a polyphase alternating-current transmission line having two distant relaying stations at opposite ends of a line section thereof, means including a pair of pilot wires for providing a communication channel between said stations, means responsive to the line currents at each of said stations for deriving a relaying current therefrom, a differential relay of the wattmetric type at each of said stations comprising a plurality of windings, certain of said windings being arranged to be energized directly by said relaying current, means for deriving from said relaying current a component of current displaced in phase therefrom to energize certain other of said windings for producing a relay-operating torque due to the interaction of the fluxes set up by the currents flowing in said windings, said other windings at each of said stations being connected in opposed-voltage relationship through said first-mentioned means so that substantially no current flows therethrough to produce a relay-operating torque under sound conditions of said line section, and means associated with each of said relays for short circuiting said pilot wires upon operation of either of said relays.

9. In a protective system for a polyphase alternating-current transmission line, means responsive to the line currents at a point on said transmission line for deriving a relaying current therefrom, similar means responsive to the line currents at another point on said transmission line remote from said first point for deriving a relaying current therefrom, means including a pair of pilot wires for providing a communication channel between said points, a relay at each of said points comprising a plurality of windings, means for energizing one of said windings directly from said relaying current, means for energizing another of said windings with a component of current derived from said relaying current but displaced in phase therefrom whereby a relay-operating torque is produced due to the interaction of the fluxes set up by the currents flowing in said windings, said last-mentioned windings of the relays at each of said points on said transmission line being electrically interconnected through said first-mentioned means in such a manner that substantially no relay-operating torque is produced under sound conditions of said line section, an additional winding on each of said relays, means for energizing said additional winding with a component of current derived from said relaying current for producing a relay-restraining torque, and means associated with each of said relays for short circuiting said pilot wires upon the operation of either of said relays.

10. In a protective system for a polyphase alternating-current transmission line having two distant relaying stations at opposite ends of a line section thereof, means for providing a communication channel between said stations, means responsive to the line currents at each of said stations for deriving a relaying current therefrom, a differential relay of the wattmetric type at each of said stations comprising a plurality of windings, certain of said windings being arranged to be energized directly by said relaying current, means for deriving from said relaying current a component of current displaced in phase therefrom to energize certain other of said windings for producing a relay-operating torque due to the interaction of the fluxes set up by the currents flowing in said windings, said other windings at each of said stations being connected in opposed-voltage relationship through said first-mentioned means so that substantially no current flows therethrough to produce a relay-operating torque under sound conditions of said line section, and means for tuning the circuit including said other relay windings and said communication channel to resonance at the frequency of the alternating current of said transmisison line, whereby a high impedance is afforded to harmonic currents to limit the voltage on said communication channel.

11. In a protective system for a polyphase alternating-current transmission line, means responsive to the line currents at a point on said transmission line including a summation transformer for deriving a relaying current therefrom, similar means responsive to the line currents at another point on said transmission line remote from said first point for deriving a relaying current therefrom, means including a pair of pilot wires for providing a communication channel between said points, a relay at each of said points comprising a plurality of windings, means for energizing one of said windings directly from said relaying current, means for energizing another of said windings with a component of current derived from said relaying current but displaced in phase therefrom whereby a relay-operating torque is produced due to the interaction of the fluxes set up by the currents flowing in said windings, said last-mentioned windings of the relays at each of said points on the transmission line being connected in opposed-voltage relationship through said pilot wires so that substantially no current flows therethrough to produce a relay-operating torque under sound conditions of said transmission line between said points, said summation transformers at each of said points on said transmission line being so constructed and arranged as to become saturated when very high currents flow in said transmission line to limit the voltage across said pilot wires, and means including a capacitance in series with said pilot wire circuit to tune said last-mentioned circuit to resonance at the frequency of the alternating current in said transmission line so as to substantially eliminate harmonic voltages from said pilot wire circuit.

12. In a protective system for a polyphase alternating-current transmission line having two distant relaying stations at opposite ends of a line section thereof, means including a pair of pilot wires for providing a communication channel between said stations, means responsive to the line currents at each of said stations including a summation transformer the output of which provides a relaying current, a relay at each of said stations comprising a plurality of windings, means for energizing one of said windings directly from the output of said summation transformer, a high-reactance transformer having its primary winding connected in series with the output of said summation transformer and its secondary winding connected in series with another of said relay windings, said last-mentioned windings at each of said stations being connected in opposed-voltage relationship through said pilot wires so that substantially no current obtained from the secondary windings of said high-reactance transformers flows therethrough to produce a relay-operating torque under sound conditions of said line section, said summation transformers at each of said stations being so strutced and arranged as to become saturated when very high currents flow in said transmission line to limit the voltage across said pilot wires, means for minimizing the effect of "freak" wave shapes in the output of said summation transformer comprising a capacitance connected in series with said pilot wire circuit to tune said last mentioned circuit to resonance at the frequency of the transmission line current, and an additional winding on each of said relays connected to the secondary winding of said high-reactance transformer for producing a relay-restraining torque proportional to the current prevailing in the transmission line at the respective relaying stations.

13. In a protective system for a polyphase alternating-current transmission line having two distant relaying stations at opposite ends of a line section thereof, means including a pair of pilot wires for providing a communication channel between said stations, means responsive to the line currents at each of said stations including a summation transformer the output of which provides a relaying current, a relay at each of said stations comprising a plurality of windings, means for energizing one of said windings directly from the output of said summation transformer, means for energizing another of said windings with a component of current derived from said relaying current but displaced in phase therefrom whereby a relay-operating torque is produced due to the interaction of the fluxes set up by the currents flowing in said windings, said last-mentioned winding at each of said stations being connected in opposed-voltage relationship through said first-mentioned means so that substantially no current flows therethrough to produce a relay-operating torque under sound conditions of said line section, an additional winding on each of said relays, means for energizing said additional winding with a component of current derived from said relaying current for producing a relay-restraining torque, and means associated with each of said summation transformers for adjusting the output thereof so that under no fault conditions occurring in said line section can said output be zero.

JOHN H. NEHER.